(12) United States Patent
Al-kadi et al.

(10) Patent No.: US 11,442,131 B2
(45) Date of Patent: Sep. 13, 2022

(54) DEVICE AND METHOD FOR UNAMBIGUOUS DETERMINATION OF ANGLE OF ARRIVAL FOR RF SIGNALS

(71) Applicant: NXP B.V., Eindhoven (NL)

(72) Inventors: Ghiath Al-kadi, Graz (AT); Ulrich Andreas Muehlmann, Graz (AT); Michael Schober, Graz (AT)

(73) Assignee: NXP B.V., Eindhoven (NL)

( * ) Notice: Subject to any disclaimer, the term of this patent is extended or adjusted under 35 U.S.C. 154(b) by 405 days.

(21) Appl. No.: 16/579,968

(22) Filed: Sep. 24, 2019

(65) Prior Publication Data

US 2020/0116813 A1  Apr. 16, 2020

(30) Foreign Application Priority Data

Oct. 15, 2018  (EP) ..................... 18200426

(51) Int. Cl.
*G01S 3/48* (2006.01)
*G01S 3/28* (2006.01)
*G01S 3/30* (2006.01)
*G01S 3/38* (2006.01)

(52) U.S. Cl.
CPC .................. *G01S 3/48* (2013.01); *G01S 3/28* (2013.01); *G01S 3/30* (2013.01); *G01S 3/38* (2013.01)

(58) Field of Classification Search
CPC ..... G01S 3/48; G01S 3/28; G01S 3/30; G01S 3/38
See application file for complete search history.

(56) References Cited

U.S. PATENT DOCUMENTS

| 7,579,988 | B2 | 8/2009 | Xu et al. |
| 8,040,279 | B2 | 10/2011 | Jo |
| 8,723,729 | B2 | 5/2014 | Desai et al. |
| 2011/0133987 | A1 | 6/2011 | Bernsten et al. |
| 2012/0015669 | A1* | 1/2012 | Qin .......................... G01S 5/12 455/456.1 |

(Continued)

OTHER PUBLICATIONS

Liu et al, "AOA Estimation for Coexisting UWB signals with Multipath Channels", 2014, International Conference on Telecommunications and Multimedia, pp. 173-178 (Year: 2014).*

*Primary Examiner* — Thomas M Hammond, III

(57) ABSTRACT

There is described a device for determining an angle of arrival of a received RF signal, the device comprising (a) a first antenna and a second antenna arranged with a predetermined distance between them on an antenna axis, the first antenna having a larger gain than the second antenna for directions corresponding to one side of the antenna axis, the second antenna having a larger gain than the first antenna for directions corresponding to the other side of the antenna axis, (b) receiver circuitry coupled to the first antenna and to the second antenna, the receiver circuitry being configured to determine a first phase and a first signal strength of a signal received by the first antenna and to determine a second phase and a second signal strength of a signal received by the second antenna, and (c) angle determining circuitry configured to determine the angle of arrival based on the first phase, the second phase, the first signal strength, and the second signal strength. There is also described a corresponding method, a computer program, and a computer program product.

9 Claims, 3 Drawing Sheets

(56) References Cited

U.S. PATENT DOCUMENTS

| | | | |
|---|---|---|---|
| 2017/0074962 A1* | 3/2017 | Badawy | G01S 3/065 |
| 2018/0024219 A1* | 1/2018 | Zhang | G01S 3/46 |
| | | | 342/417 |
| 2018/0031671 A1* | 2/2018 | Alexander | G01S 5/06 |
| 2019/0056472 A1* | 2/2019 | Smith | G01S 3/48 |
| 2019/0086505 A1* | 3/2019 | Malik | H04W 4/02 |

* cited by examiner

DEVICE AND METHOD FOR UNAMBIGUOUS DETERMINATION OF ANGLE OF ARRIVAL FOR RF SIGNALS

CROSS-REFERENCE TO RELATED APPLICATIONS

This application claims priority under 35 U.S.C. § 119 to European Patent Application No. 18200426.7, filed on Oct. 15, 2018, the contents of which are incorporated by reference herein.

FIELD OF THE INVENTION

The present invention relates to the field of angle of arrival determination for radio frequency (RF) signals. More specifically, the present invention relates to a device for determining an angle of arrival of a received RF signal, a method of determining an angle of arrival of a received RF signal, computer program for carrying out the method, and a computer program product.

ART BACKGROUND

Known Angle of Arrival (AoA) measurement systems use phase information of the signals received by several (at least two) antennas. The antennas are arranged in an array with known distances between them. The distance needs to be known to the system for calculating the AOA. Bigger distances will result in higher accuracy but also higher ambiguity, while smaller distances will result in lower measurement accuracy but also smaller ambiguity. Only the symmetric ambiguity can't be resolved by changing the distance only Because of the distance between the antennas, a signal which is received will be correspondingly shifted in phase. This phase shift is depending on the angle corresponding to the direction of the incoming signal and the distance between the antennas. Knowing the distance between the antennas and measuring the phase shift, the reception angle can be calculated. The problem of such systems, which are just using the phase information of the signal, is that the angle of arrival cannot be determined unambiguously. This is because a signal arriving from a source located at a position on one side of the axis on which the antennas are arranged will cause the same result for the angle calculation as a signal arriving from a source located at a mirrored position on the other side of the axis.

This is illustrated in FIG. 1 which shows a first antenna 110 and a second antenna 120 arranged with a distance L between them. The phase shift of the sampled signal S is caused by the difference in propagation path length Δl. The angle of the received signal S is a (relative to the antenna axis 130). However, as can be seen from the figure, a signal S' arriving at the angle −α, i.e. a mirrored signal, would cause the same phase measurement values as the difference in propagation path length would also be Δl in this case.

The ambiguity may be resolved by adding a third antenna, which is not located on the axis of the two other antennas. However, this would incur additional costs due to the extra antenna and the additional sampling and processing resources needed.

There may thus be a need for a simple and cost-efficient way of unambiguous determination of the angle of arrival.

SUMMARY OF THE INVENTION

This need may be met by the subject matter according to the independent claims. Advantageous embodiments of the present invention are set forth in the dependent claims.

According to a first aspect, there is provided a device for determining an angle of arrival of a received RF signal, the device comprising (a) a first antenna and a second antenna arranged with a predetermined distance between them on an antenna axis, the first antenna having a larger gain than the second antenna for directions corresponding to one side of the antenna axis, the second antenna having a larger gain than the first antenna for directions corresponding to the other side of the antenna axis, (b) receiver circuitry coupled to the first antenna and to the second antenna, the receiver circuitry being configured to determine a first phase and a first signal strength of a signal received by the first antenna and to determine a second phase and a second signal strength of a signal received by the second antenna, and (c) angle determining circuitry configured to determine the angle of arrival based on the first phase, the second phase, the first signal strength, and the second signal strength.

This aspect is based on the idea that the use of two antennas with different directional gain characteristics makes it possible to determine the angle of arrival unambiguously, in particular such that signals originating from mirrored sources (i.e. sources located on opposite sides of the antenna axis) can be properly distinguished from one another. This is done by taking not only the phases but also the signal strengths into consideration. Since signal strength measurement can be performed by most standard receiver circuitry, no additional hardware is needed (in comparison to known ambiguous angle of arrival determination systems) to implement this aspect.

The antennas (i.e. the first antenna and the second antenna) must exhibit certain directional gain characteristics and be arranged in such a way that on one side of the antenna axis (e.g. in front of the antenna), the gain of the first antenna is generally larger than the gain of the second antenna. Thereby, for sources located on this side of the antenna axis, the signal received by the first antenna will have larger signal strength than the corresponding signal received by the second antenna. Similarly, on the other side of the antenna axis (e.g. behind the antenna), the gain of the second antenna must generally be larger than the gain of the first antenna. Thereby, for sources located on the other (i.e. opposite) side of the antenna axis, the signal received by the second antenna will have larger signal strength than the corresponding signal received by the first antenna. Accordingly, be comparing the respective signal strengths, it can be determined from which side of the antenna axis the received signal is originating.

In the present context, the term "one side of the antenna axis" may particularly denote space on one side of a plane containing the antenna axis. Similarly, the term "the other side of the antenna axis" may particularly denote space on the other side (i.e. on the opposite side) of the abovementioned plane containing the antenna axis.

According to an embodiment, the first antenna is a directional antenna having a first gain for directions corresponding to the one side of the antenna axis and a second gain for directions corresponding to the other side of the antenna axis, the first gain being larger than the second gain.

In other words, the signal strength of a received signal originating from a source located on the one side of the antenna axis will be larger than for a signal originating from a source located on the other side of the antenna axis. With knowledge of the directional gain characteristics of the second antenna, this allows for determining whether the signal is arriving from the one side or from the other side of the antenna axis.

According to a further embodiment, the second antenna is an omnidirectional antenna.

In other words, the second antenna will provide essentially the same signal strength for all possible locations of the signal source. Thereby, considering the known directional gain characteristic of the first antenna, it can be unambiguously determined whether the signal arrives from the one side or from the other side of the antenna axis.

According to a further embodiment, the first antenna has a gain between the first gain and the second gain of the first antenna.

Accordingly, the signal provided by the first antenna will, depending on whether the signal originates from the one side or from the other side of the antenna axis, either be stronger or weaker than the signal provided by the second antenna.

According to a further embodiment, the second antenna is a directional antenna having a third gain for directions corresponding to the one side of the antenna axis and a fourth gain for directions corresponding to the other side of the antenna axis, the fourth gain being larger than the third gain.

In other words, the second antenna has a directional gain characteristic which is opposite to the directional gain characteristic of the first antenna in the sense that the larger gain (i.e. the fourth gain) occurs in the same directional sector where the first antenna has its lower gain (i.e. the second gain), and vice versa.

Thereby, the difference between the first signal strength and the second signal strength will be more pronounced in comparison to the embodiment where the second antenna is omnidirectional.

According to a further embodiment, the fourth gain is equal to the first gain and the third gain is equal to the second gain.

In other words, in this embodiment the first antenna and the second antenna are identical but rotated 180° relative to each other.

According to a further embodiment, the angle determining circuitry is configured to determine a value of the angle of arrival based on a difference between the first phase and the second phase and to determine whether the signal is received from the one side or from the other side of the antenna axis based on a difference between the first signal strength and the second signal strength.

In other words, the determination of the angle of arrival involves two differences: a phase difference and a signal strength difference. The phase difference allows determination of an ambiguous angle of arrival while the signal strength difference allows resolving the ambiguity. That is, when the phase difference corresponds to an angle of ±α, the signal strength difference makes it possible to determine whether the actual angle of arrival is in fact +α or −α, i.e. whether the signal arrives from one side or the other relative to the antenna axis.

According to a second aspect, there is provided a method of determining an angle of arrival of a received RF signal, the method comprising (a) receiving a signal at a first antenna and at a second antenna, the first antenna and second antenna being arranged with a predetermined distance between them on an antenna axis, the first antenna having a larger gain than the second antenna for directions corresponding to one side of the antenna axis, the second antenna having a larger gain than the first antenna for directions corresponding to the other side of the antenna axis, (b) determining a first phase and a first signal strength of the signal received by the first antenna, (c) determining a second phase and a second signal strength of the signal received by the second antenna, and (d) determining the angle of arrival based on the first phase, the second phase, the first signal strength, and the second signal strength.

This aspect is essentially based on the same idea as the first aspect discussed above.

According to a third aspect, there is provided a computer program comprising computer executable instructions which, when executed by a computer, causes the computer to perform the steps of the method according to the second aspect.

According to a fourth aspect, there is provided a computer program product comprising a computer readable data carrier loaded with a computer program according to the third aspect.

It should be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present invention will be apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
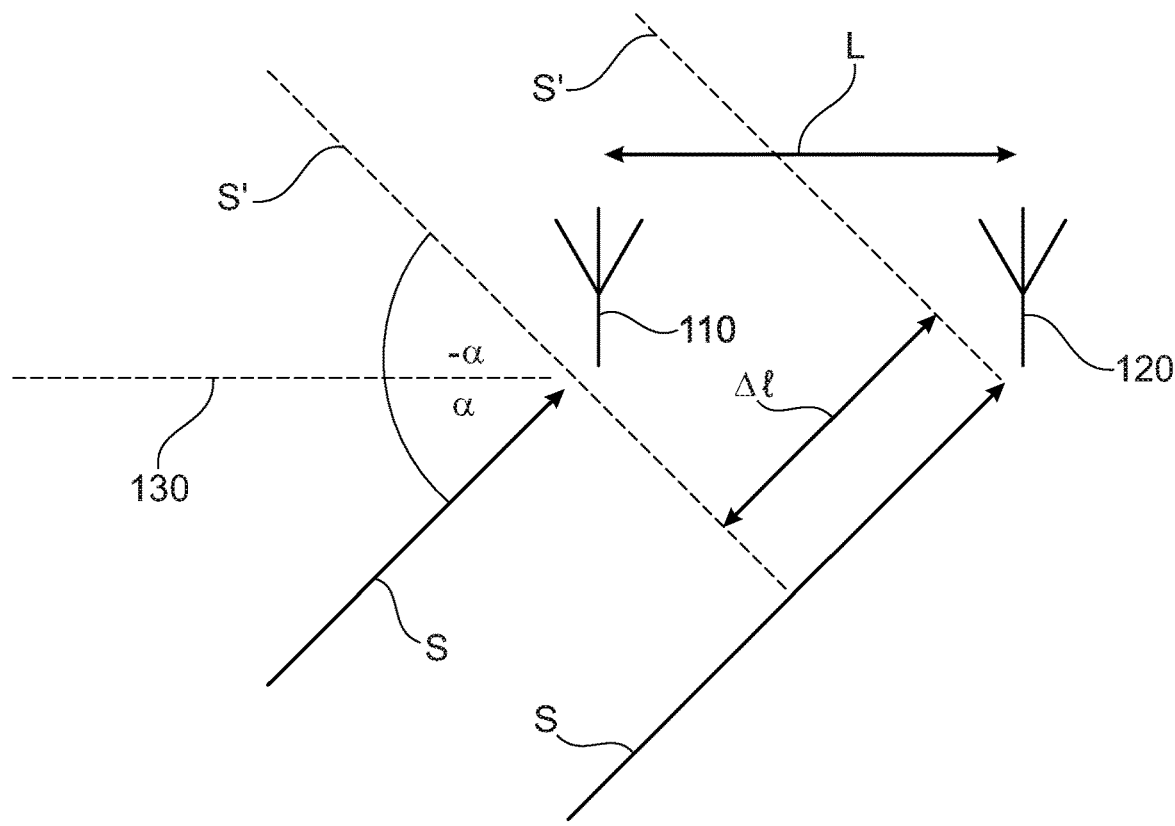
FIG. 1 shows the principle of determining an ambiguous angle of arrival from phase measurements with two antennas.

The illustration in the drawing is schematic. It is noted that in different figures, similar or identical elements are provided with the same reference signs or with reference signs, which differ only within the first digit.

FIG. 1 shows the principle of determining an ambiguous angle of arrival α from phase measurements with two antennas 110, 120 as already discussed in the background art section.

Figure 2:
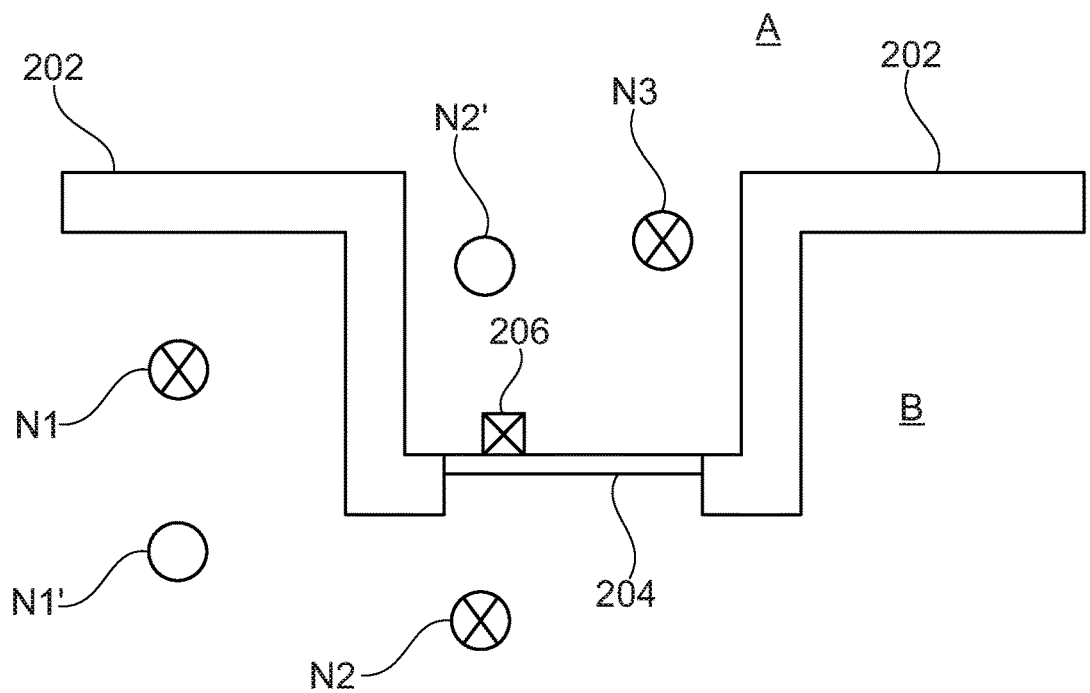
FIG. 2 illustrates the need for unambiguous angle of arrival determination in a wireless door lock system.

FIG. 2 illustrates the need for unambiguous angle of arrival determination in a wireless door lock system. More specifically, FIG. 2 shows a building with walls 202 delimiting the outside A from the inside B, a door 204 and an electronic door look 206. The electronic door lock 206 comprises an angle of arrival detection system corresponding to the one discussed in conjunction with FIG. 1. N1 is a first true position of an RF transmitter, such as an NFC device, and N1' is a corresponding mirrored position which, due to the ambiguous angle of arrival, cannot be distinguished from the true position N1. Here, the antenna axis is parallel to the door 204. Both the true position N1 and the mirrored position N1' are located inside the building, i.e. in region B. Similarly, N2 is a second true position of an RF transmitter and N2' is a corresponding mirrored position. In this case, the true position N2 is inside the building, i.e. in region B, while the mirrored position N2' is outside of the building, i.e. in region A. N3 indicates a position of a non-authorized person, i.e. a person without access rights for the building who should therefore not be able to open the door 204. When an authorized person is located at the position N2, i.e. inside the building, the door should not open as the person is already inside. However, if the ambiguity in the angle of arrival determination causes the lock 206 to determine an angle of arrival corresponding to the mirrored position N2', i.e. outside the building, the lock 206 will open the door 204, such that the unauthorized person at position N3 will be able to enter the building through the door 204. As can be seen from this example, an effective and safe electronic door lock system required an unambiguous determination of the angle of arrival.

Figure 3:
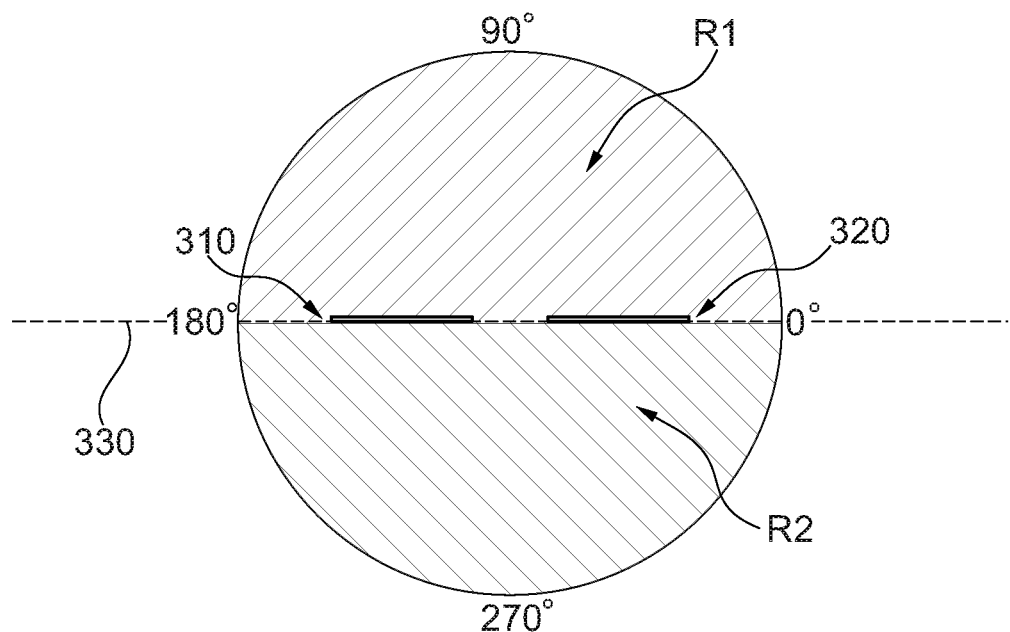
FIG. 3 shows a device in accordance with an embodiment.

FIG. 3 shows a device in accordance with an embodiment. More specifically, the device comprises a first antenna 310, a second antenna 320, receiver circuitry (not shown) coupled to the antennas 310, 320, and angle determining circuitry (not shown). The first and second antennas 310, 320, have different directional characteristics, i.e. different relations between antenna gain and angle relative to the antenna axis 330. More specifically, on one (i.e. the upper) side of the antenna axis, the first antenna 310 has a larger gain than the second antenna 320. This is indicated as region R1 corresponding to angles of arrival between 0° and 180°. On the other (i.e. the lower) side of the antenna axis 330, the second antenna 320 has a larger gain than the first antenna 310. This is indicated as region R2 corresponding to angles of arrival between 180° and 360°. With this structure, the ambiguity of the angle of arrival that is present when only phase information is considered can be resolved. More specifically, when the signal from the first antenna 310 is stronger than the signal from the second antenna 320, the source must be located in region R1. Similarly, when the signal from the second antenna 320 is stronger than the signal from the first antenna 310, the source must be located in region R2. The numerical value of the angle of arrival is determined by considering the phase difference and the distance between the first and second antennas 310, 320 along the antenna axis 330.

Figure 4:
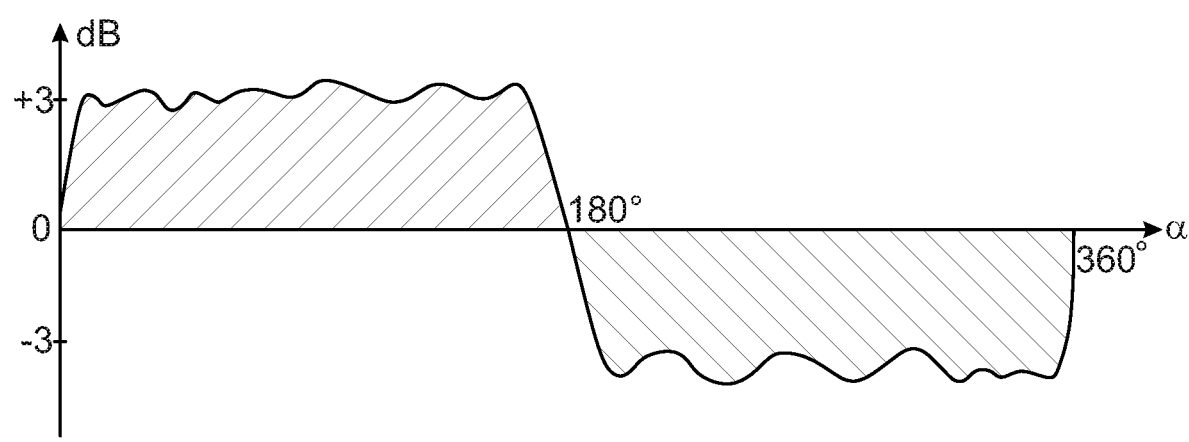
FIG. 4 shows a plot of a relation between antenna gain difference and angle of arrival in accordance with an embodiment.

FIG. 4 shows a plot of a relation between antenna gain difference and angle of arrival in accordance with an embodiment. More specifically, FIG. 4 shows the difference between the gain of the first antenna 310 and the gain of the second antenna 320 as a function of the actual angle of arrival α. As can be seen, the gain of the first antenna 310 is 3 dB larger than the gain of the second antenna 320 for angles of arrival α between 0° and 180° while the gain of the second antenna 320 is 3 dB larger than the gain of the first antenna 310 for angles of arrival α between 180° and 360°. Thus, the difference between the gain of the first antenna 310 and the gain of the second antenna 320 is around 3 dB for α between 0° and 180° and around −3 dB for a between 180° and 360°. Thus. by determining the signal strengths of the signal from the first antenna 310 and second antenna 320 and calculating the difference, it can easily be determined whether the true angle of arrival is between 0° and 180° (region R1 in FIG. 3) or between 180° and 360° (region R2 in FIG. 3).

Figure 5:
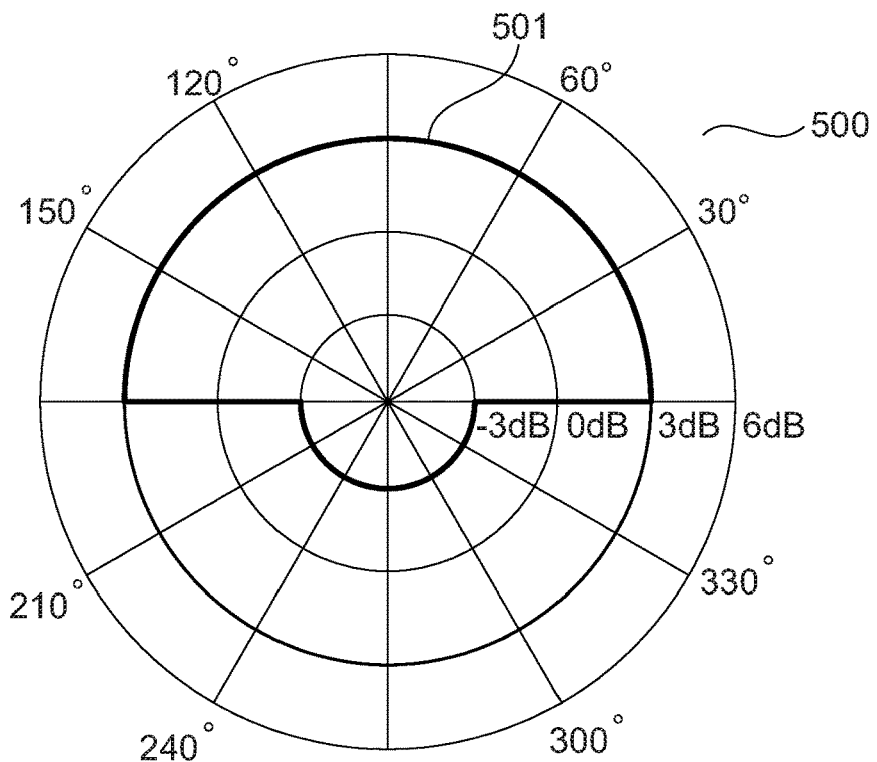
FIG. 5 shows a gain characteristic of a directional antenna in accordance with an embodiment.
Figure 6:
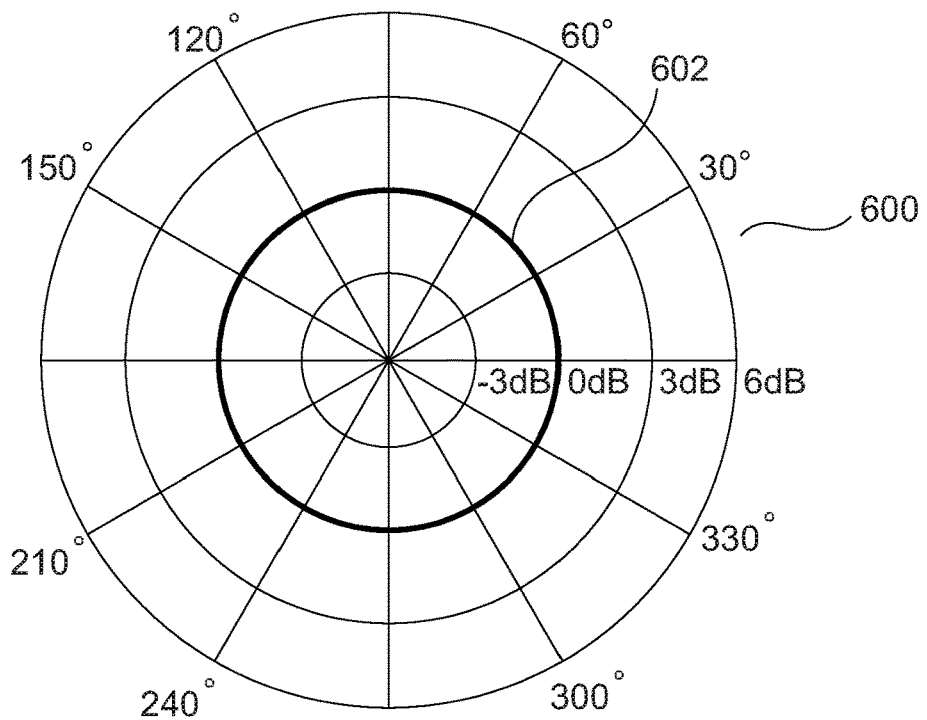
FIG. 6 shows a gain characteristic of an omnidirectional antenna in accordance with an embodiment.

This behavior can be obtained in several ways. One possibility is to use a directional antenna having the gain characteristic 500 shown in FIG. 5 as the first antenna 310 and an omnidirectional antenna having the gain characteristic 600 shown in FIG. 6 as the second antenna 320. As can be seen from FIG. 5, the gain 501 of the directional antenna is +3 dB for angles of arrival between 0° and 180° and −3 dB for angles of arrival between 180° and 360°. In comparison, the gain 602 of the omnidirectional antenna is, as shown in FIG. 6, equal to 0 dB for all angles of arrival (i.e. between 0° and) 360°. Another possibility is to use directional antennas having the gain characteristic 500 shown in FIG. 5 for both the first antenna 310 and the second antenna 320, where the two antennas have opposite orientations in the sense that they are arranged such that the directions with large gain are opposite to each other. This would increase the difference in signal strengths to ±6 dB in comparison to the ±3 dB shown in FIG. 4.

The dB values in this section are just examples. If there is a big gain difference between the antennas, the probability of not making ambiguity related measurement errors is bigger compared to a smaller antenna gain difference. Basically, the decision on the gain difference must be made in consideration of the environment, the expected signal quality and the measurement system.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:

1. A device for determining an angle of arrival of a received RF signal, the device comprising:
 a first antenna and a second antenna arranged with a predetermined distance between them on an antenna axis, the first antenna having a larger gain than the second antenna for directions corresponding to one side of the antenna axis, the second antenna having a larger gain than the first antenna for directions corresponding to the other side of the antenna axis;
 receiver circuitry coupled to the first antenna and to the second antenna, the receiver circuitry being configured to determine a first phase and a first signal strength of a signal received by the first antenna and to determine a second phase and a second signal strength of a signal received by the second antenna;
 angle determining circuitry configured to determine the angle of arrival based on the first phase, the second phase, the first signal strength, and the second signal strength;
 wherein the first antenna is a directional antenna having a first gain for directions corresponding to the one side of the antenna axis and a second gain for directions corresponding to the other side of the antenna axis, the first gain being larger than the second gain; and
 wherein the second antenna is an omnidirectional antenna having a gain that is less than the first gain of the first antenna and greater than the second gain of the first antenna.

2. The device according to claim 1, wherein the angle determining circuitry is configured to determine a value of the angle of arrival based on a difference between the first phase and the second phase and to determine whether the signal is received from the one side or from the other side of the antenna axis based on a difference between the first signal strength and the second signal strength.

3. The device according to claim 1, wherein;
the first gain for directions corresponding to the one side of the antenna axis corresponds to an angle of arrival between 0 and 180 degrees; and
the second gain for directions corresponding to the other side of the antenna axis corresponds to an angle of arrival between 180 and 360 degrees.

4. The device according to claim 1, wherein the gain of the omnidirectional is the same for directions corresponding to the one side of the antenna axis and for directions corresponding to the other side of the antenna axis.

5. The device according to claim 1, wherein the gain of the omnidirectional antenna corresponds to a numerical gain value.

6. The device according to claim 5, wherein the numerical gain value is zero decibels (dB).

7. A method of determining an angle of arrival of a received RF signal, the method comprising:
receiving a signal at a first antenna and at a second antenna, the first antenna and the second antenna being arranged with a predetermined distance between them on an antenna axis, the first antenna having a larger gain than the second antenna for directions corresponding to one side of the antenna axis, the second antenna having a larger gain than the first antenna for directions corresponding to the other side of the antenna axis;
determining a first phase and a first signal strength of the signal received by the first antenna;
determining a second phase and a second signal strength of the signal received by the second antenna;
determining the angle of arrival based on the first phase, the second phase, the first signal strength, and the second signal strength;
wherein the first antenna is a directional antenna having a first gain for directions corresponding to the one side of the antenna axis and a second gain for directions corresponding to the other side of the antenna axis, the first gain being larger than the second gain; and
wherein the second antenna is an omnidirectional antenna having a gain that is less than the first gain of the first antenna and greater than the second gain of the first antenna.

8. A computer program comprising computer executable instructions which, when executed by a computer, causes the computer to perform the steps of the method according to claim 7.

9. A computer program product comprising a computer readable data carrier loaded with a computer program according to claim 8.

* * * * *